US012597156B2

(12) United States Patent
Fu et al.

(10) Patent No.: US 12,597,156 B2
(45) Date of Patent: Apr. 7, 2026

(54) ANALYZING SYSTEM FOR IDENTIFYING AND MEASURING SOLAR PANEL MODULE

(71) Applicant: National University of Tainan, Tainan City (TW)

(72) Inventors: Yao-Hsien Fu, Kaohsiung City (TW); Chia-Tsung Hung, Tainan City (TW)

(73) Assignee: National University of Tainan, Tainan City (TW)

( * ) Notice: Subject to any disclaimer, the term of this patent is extended or adjusted under 35 U.S.C. 154(b) by 355 days.

(21) Appl. No.: 18/505,883

(22) Filed: Nov. 9, 2023

(65) Prior Publication Data

US 2025/0061598 A1     Feb. 20, 2025

(30) Foreign Application Priority Data

Aug. 17, 2023    (TW) ................................. 112130970

(51) Int. Cl.
*G06T 7/60*          (2017.01)
*G01B 11/06*         (2006.01)
(Continued)

(52) U.S. Cl.
CPC ................ *G06T 7/60* (2013.01); *G01B 11/06* (2013.01); *G01B 17/02* (2013.01); *G01G 21/28* (2013.01);
(Continued)

(58) Field of Classification Search
CPC . G06T 7/60; G06T 2207/30108; G06V 20/50; G06V 30/19
See application file for complete search history.

(56)              References Cited

U.S. PATENT DOCUMENTS 8,228,088 B1 *   7/2012   Hinze ..................... H02S 50/10
                                                       324/762.01
10,198,710 B1 *  2/2019   Hahn ................. G01G 19/4144
                 (Continued)

FOREIGN PATENT DOCUMENTS

CA        2998389 A1 *   4/2010   ............. G06Q 10/08
CN        103066886 A     4/2013
                 (Continued)

OTHER PUBLICATIONS

Taiwanese Search Report for Taiwanese Application No. 112130970, dated Jul. 12, 2024, with English translation.
(Continued)

*Primary Examiner* — Ted W Barnes
(74) *Attorney, Agent, or Firm* — Birch, Stewart, Kolasch & Birch, LLP

(57)              ABSTRACT
An analyzing system for identifying and measuring a solar panel module is provided. The solar panel module includes a product label that is attached thereon. The analyzing system includes a housing, a carrying unit, and an image recognition unit. The carrying unit is mounted on the housing and is configured to carry the solar panel module and to measure a weight of the solar panel module that is carried by the carrying unit. The image recognition unit is mounted on the housing and is configured to move relative to the carrying unit and, while moving relative to the carrying unit that is carrying the solar panel module, to capture an image of the solar panel module. The image recognition unit is configured to process the image thus captured to obtain dimension data and product information of the solar panel module, where the product information is related to the product label.

14 Claims, 13 Drawing Sheets

(51) Int. Cl.

| | |
|---|---|
| *G01B 17/02* | (2006.01) |
| *G01G 21/28* | (2006.01) |
| *G06V 20/50* | (2022.01) |
| *G06V 30/19* | (2022.01) |
| *G06V 30/30* | (2022.01) |

(52) U.S. Cl.

CPC .... *G06V 20/50* (2022.01); *G06T 2207/30108* (2013.01); *G06V 30/19* (2022.01); *G06V 30/30* (2022.01)

(56) References Cited

U.S. PATENT DOCUMENTS

| | | | |
|---|---|---|---|
| 2009/0321511 A1* | 12/2009 | Browne | B29B 17/02 |
| | | | 705/308 |
| 2010/0070388 A1* | 3/2010 | Spindler | G06Q 10/087 |
| | | | 707/609 |
| 2023/0236582 A1* | 7/2023 | Fu | H10F 19/80 |
| | | | 700/95 |
| 2023/0283233 A1* | 9/2023 | Miyamichi | H02S 50/10 |
| | | | 324/76.11 |
| 2023/0299716 A1* | 9/2023 | Miyamichi | H02S 50/15 |
| | | | 324/761.01 |
| 2023/0306625 A1* | 9/2023 | Peruch | G06K 7/1413 |

FOREIGN PATENT DOCUMENTS

| | | | | | |
|---|---|---|---|---|---|
| CN | 112953378 | A | * | 6/2021 | H02S 40/10 |
| CN | 220796770 | U | * | 4/2024 | |
| EP | 1208521 | B1 | * | 3/2006 | G06K 7/10702 |
| JP | H10146580 | A | * | 6/1998 | |
| JP | 2015192942 | A | * | 11/2015 | |
| TW | 202330124 | A | * | 8/2023 | H10F 71/00 |

OTHER PUBLICATIONS

Extended European Search Report for European Application No. 23209766.7, dated Feb. 2, 2024.

\* cited by examiner

ANALYZING SYSTEM FOR IDENTIFYING AND MEASURING SOLAR PANEL MODULE

CROSS-REFERENCE TO RELATED APPLICATION

This application claims priority to Taiwanese Invention patent application Ser. No. 11/213,0970, filed on Aug. 17, 2023.

FIELD

The disclosure relates to an analyzing system, and more particularly to an analyzing system for identifying and measuring a solar panel module.

BACKGROUND

A solar panel module generally includes a solar panel that is configured to convert sunlight into electric power, a frame that surrounds the solar panel, and a junction box that is disposed on a back surface of the solar panel. The solar panel includes a cover layer, a base layer, and a plurality of solar cells that are sandwiched between the cover layer and the base layer.

Conventional methods for recycling a solar panel module include chemically or thermally decomposing the solar panel, or physically removing different layers of the solar panel by milling or grinding. However, since there are more than 17,000 specifications of solar panel modules at present, it may be hard to accurately and efficiently obtain product information, dimension information, structure data, and junction box position information for different specifications of solar panel modules before performing the conventional methods for recycling the solar panel module.

SUMMARY

Therefore, an object of the disclosure is to provide an analyzing system that can alleviate at least one of the drawbacks of the prior art.

According to the disclosure, an analyzing system for identifying and measuring a solar panel module is provided. The solar panel module includes a solar panel and a product label that is attached on the solar panel. The analyzing system includes a housing, a carrying unit, and an image recognition unit. The carrying unit includes a weighing module that is mounted on the housing, and a carrying module that is mounted on the weighing module and that is configured to carry the solar panel module placed into the housing. The weighing module is configured to measure a weight of the solar panel module that is carried by the carrying module. The image recognition unit includes a first transfer module, a capturing module, and an image analyzing module. The first transfer module is mounted on the housing and is configured to move relative to the carrying module. The capturing module is mounted on the first transfer module and is configured to be driven by the first transfer module to move relative to the carrying module and, while moving relative to the carrying module that is carrying the solar panel module, to capture an image of the solar panel module. The image analyzing module is electrically connected to the capturing module and is configured to process the image captured by the capturing module to obtain dimension data and product information of the solar panel module, where the product information is related to the product label.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
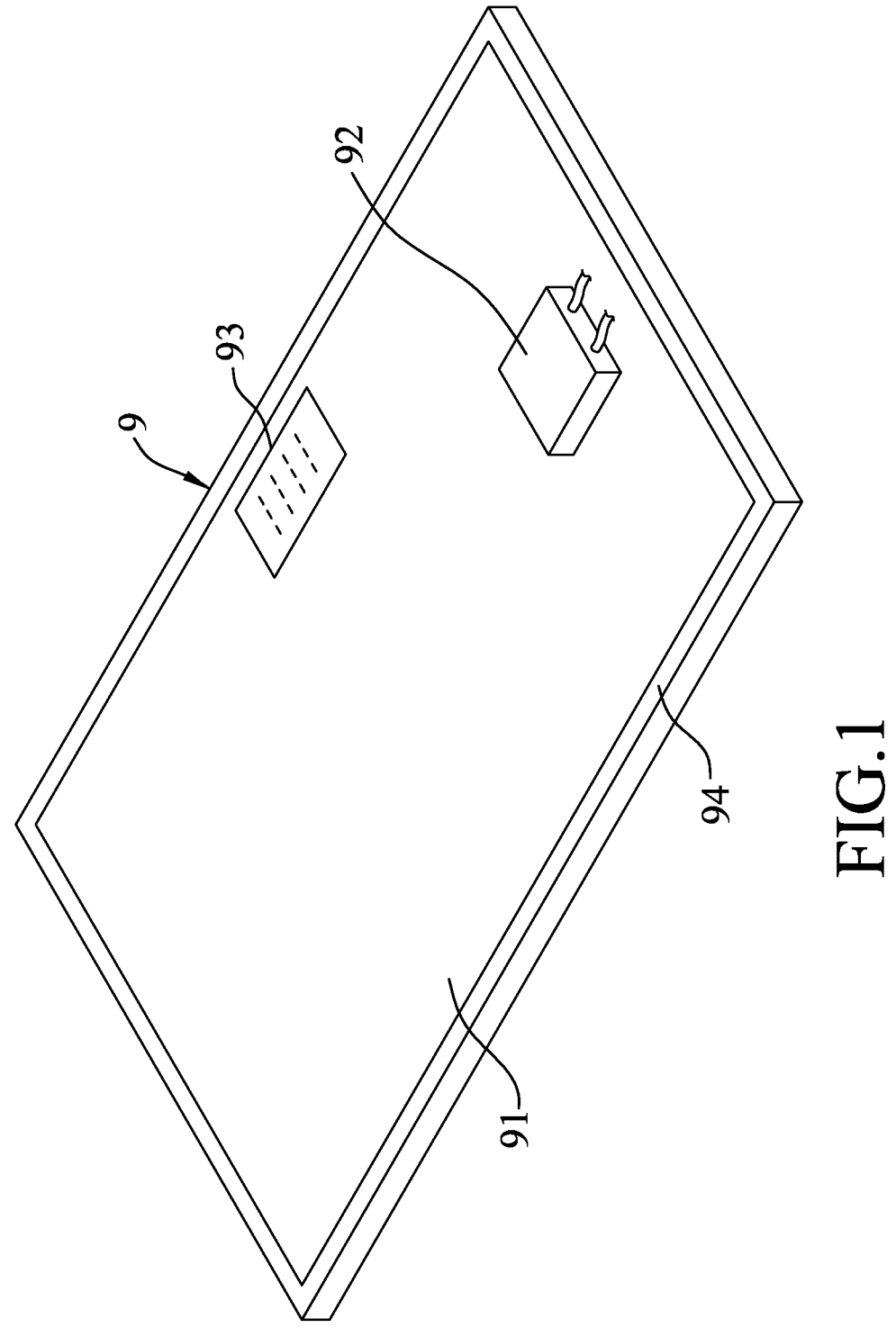
FIG. 1 is a schematic view illustrating a solar panel module.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
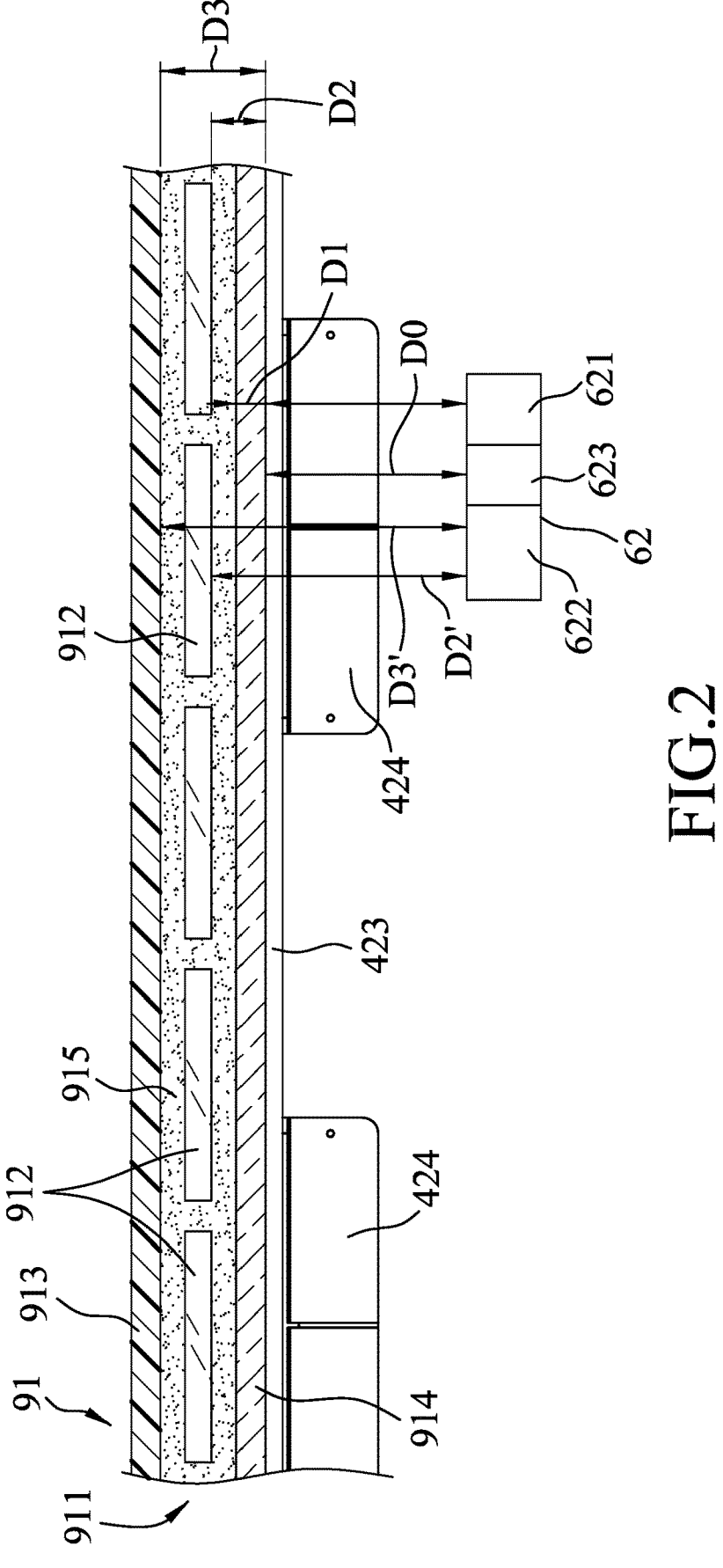
FIG. 2 is a schematic view illustrating a measuring module for measuring various layers of the solar panel module according to a first embodiment of the disclosure.
Figure 3:
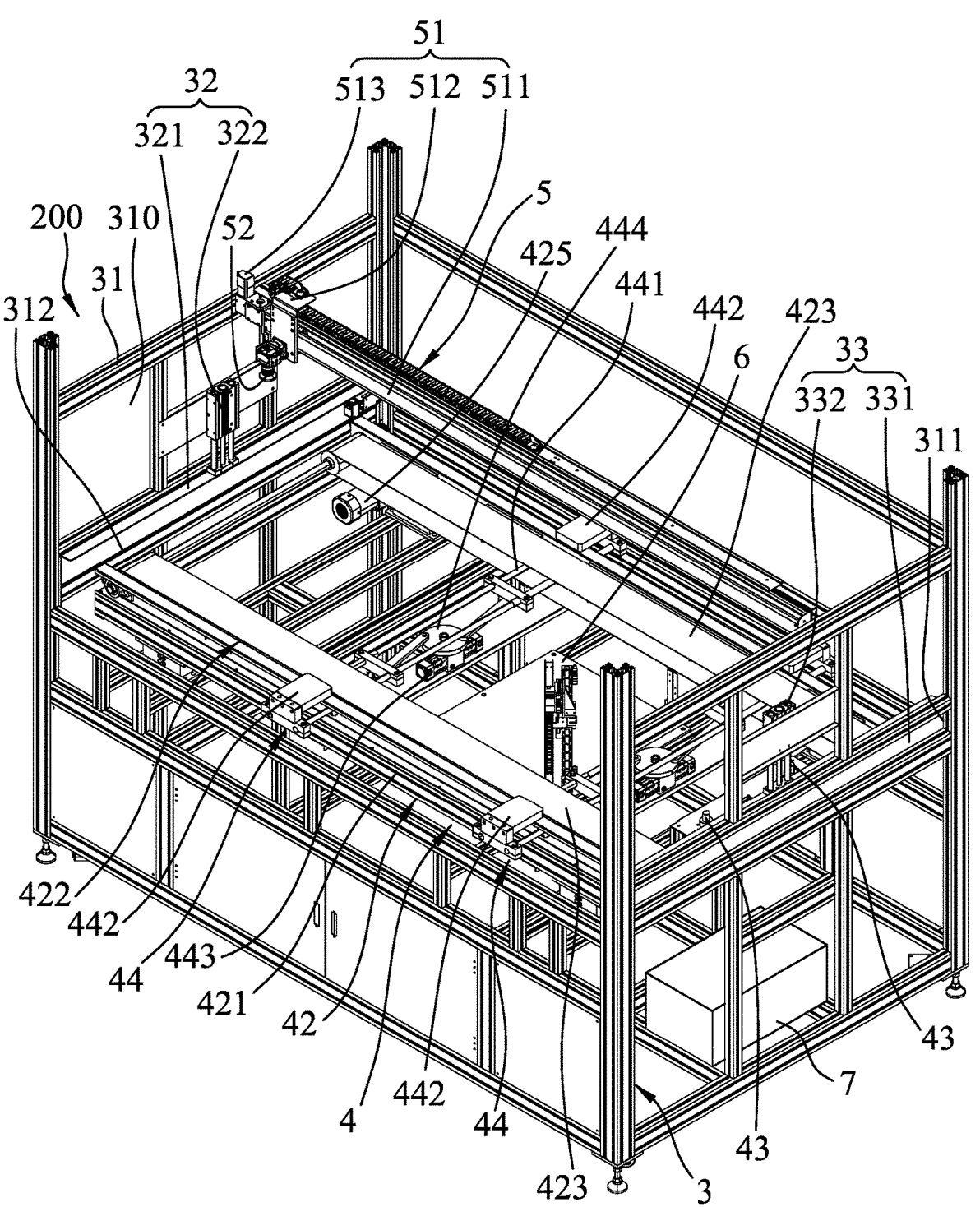
FIG. 3 is a perspective view of an analyzing system for identifying and measuring a solar panel module according to the first embodiment of the disclosure.
Figure 4:
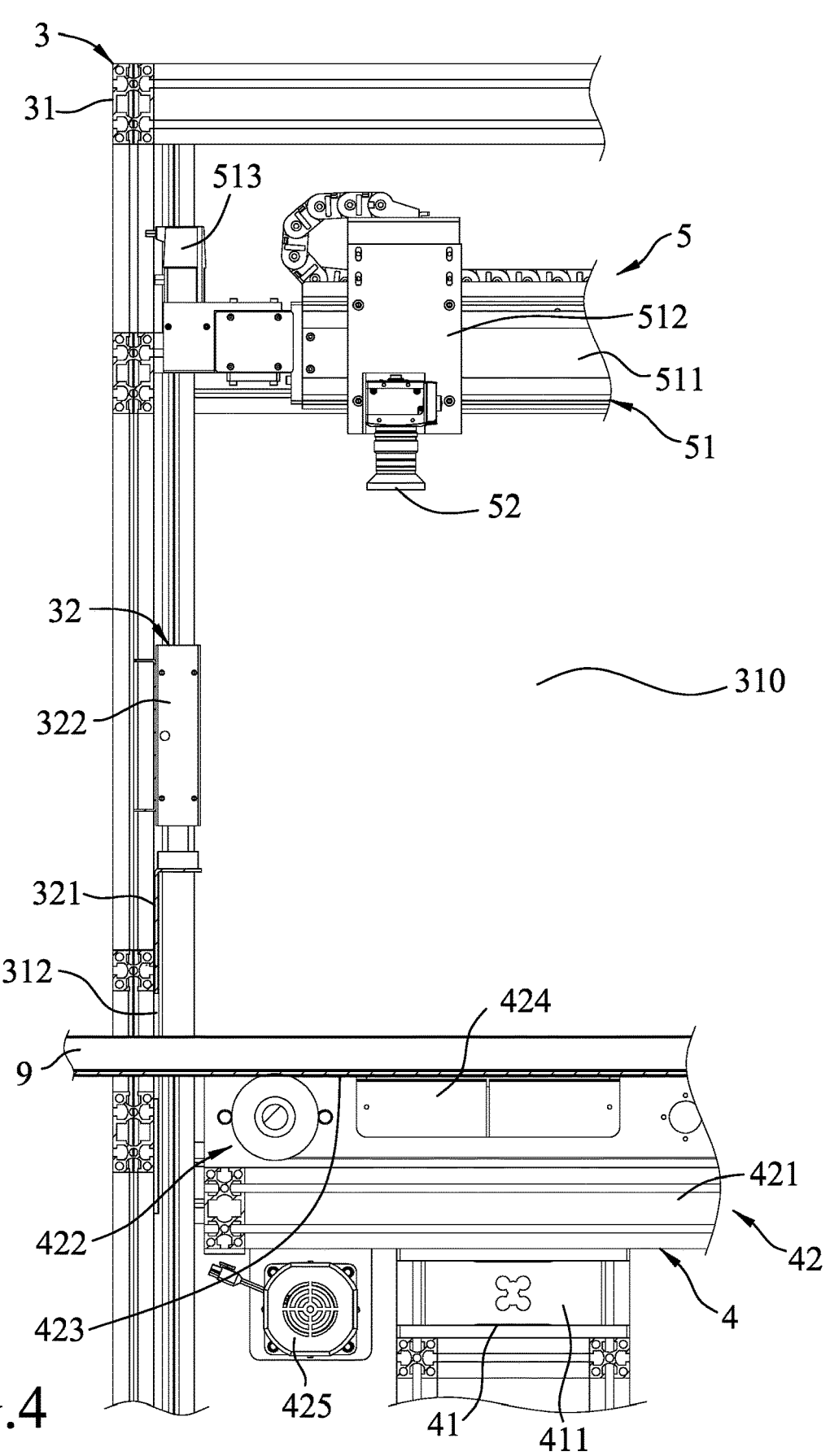
FIG. 4 is a fragmentary side view illustrating a first door module of the analyzing system according to the first embodiment of the disclosure.
Figure 5:
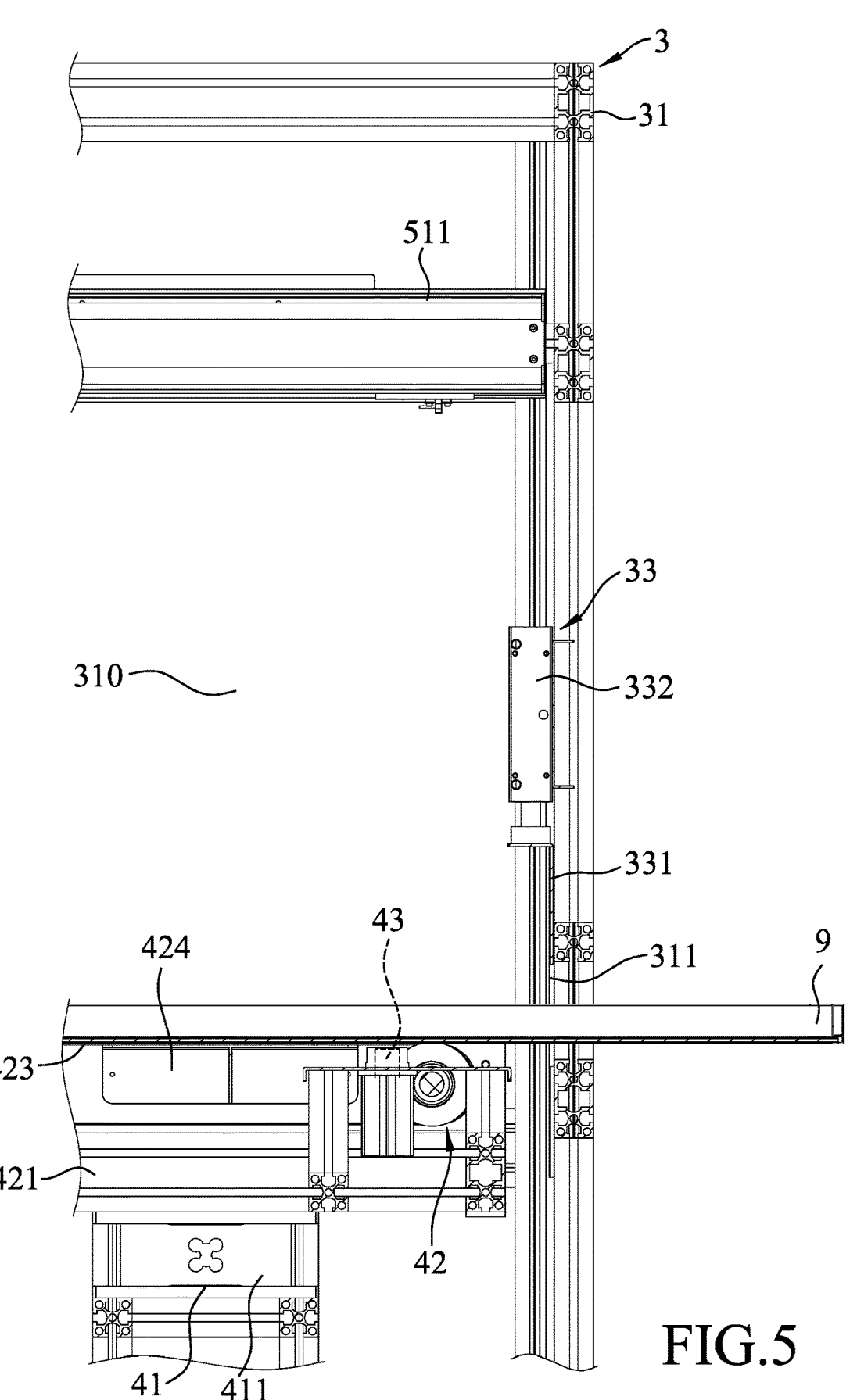
FIG. 5 is a fragmentary side view illustrating a second door module of the analyzing system according to the first embodiment of the disclosure.

Referring to FIGS. 1 to 3, an analyzing system 200 for identifying and measuring a solar panel module 9 according to a first embodiment of the disclosure is provided. The analyzing system 200 is configured to identify specifications and to measure dimensions of the solar panel module 9. The solar panel module 9 includes a solar panel 91, a junction box 92 that is disposed on the solar panel 91, a product label 93 that is attached on the solar panel 91, and a frame 94 that surrounds the solar panel 91. The solar panel 91 includes a base layer 913, a cover layer 914, and a solar cell unit 911 that is sandwiched between the base layer 913 and the cover layer 914. The solar cell unit 911 includes an adhesive layer 915 that is bonded to the cover layer 914 and the base layer 913, and a plurality of solar cells 912 that are embedded in the adhesive layer 915 and that are arranged horizontally in a matrix and spaced apart from each other (i.e., having a plurality of gaps among the solar cells 912). The junction box 92 and the product label 93 are both disposed on a base surface of the base layer 913 that is further away from the cover layer 914. In the first embodiment, the analyzing system 200 is configured to receive the solar panel module 9 in a manner that the base layer 913 is facing upward, and thus the junction box 92 and the product label 93 are facing upward.

Referring to FIGS. 3 to 5 and 10, the analyzing system 200 includes a housing 3, a carrying unit 4 that is mounted on the housing 3, an image recognition unit 5, a measuring unit 6, and a control unit 7 that is electrically connected to the housing 3, the carrying unit 4, the image recognition unit 5, and the measuring unit 6. For example, the control unit 7 may be embodied using a computer and may include, but is not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The housing 3 includes a main body 31 that surrounds and defines an inner space 310. The inner space 310 has an entrance 312 at a first side of the inner space 310, and an exit 311 at a second side of the inner space 310 opposite to the first side. The housing 3 further includes a first door module 32 and a second door module 33 that are respectively mounted on a first side and a second side of the main body 31, and that are controllable by the control unit 7 to openably close the entrance 312 and the exit 311, respectively. Specifically, the first side and the second side of the main body 31 correspond respectively to the first side and the second side of the inner space 310. A first direction is defined as a direction in which the first side and the second side of the inner space 310 are opposite to each other, and a second direction is defined as a direction perpendicular to the first direction and an up-down direction of the analyzing system 200. The inner space 310 is defined by a combination of a plurality of rods and a plurality of walls of the main body 31. Since the main body 31 may be realized in various forms, and is not the emphasis of this disclosure, it will not be described in further detail for the sake of brevity. Some of the rods and the walls of the main body 31 are omitted in the drawings of this disclosure so as to clearly illustrate other components that are disposed in the inner space 310, and thus the main body 31 should not be limited to the structure shown in FIG. 3.

The first door module 32 includes a first door panel 321 that is mounted on the first side of the main body 31 and that is configured to openably close the entrance 312, and a first driving component 322 that is mounted on the main body 31 and that is connected to the first door panel 321. The first driving component 322 is electrically connected to the control unit 7, and is configured to be controlled by the control unit 7 to open the first door panel 321 so as to expose the entrance 312. The second door module 33 includes a second door panel 331 that is mounted on the second side of the main body 31 and that is configured to openably close the exit 311, and a second driving component 332 that is mounted on the main body 31 and that is connected to the second door panel 331. The second driving component 332 is electrically connected to the control unit 7, and is configured to be controlled by the control unit 7 to open the second door panel 331 so as to expose the exit 311. In this embodiment, each of the first driving component 322 and the second driving component 332 may at least include an electric motor, a pneumatic actuator (e.g., a pneumatic motor), a hydraulic cylinder, or any other actuators capable of driving the first/second door panel 321, 331 to move.

Referring to FIGS. 3, 6, 7, and 8, the carrying unit 4 is disposed in the inner space 310 and includes a weighing module 41 that is mounted on the main body 31, a carrying module 42 that is mounted on the weighing module 41, two first alignment modules 43 that are mounted on one end of the carrying module 42 adjacent to and inside the exit 311, and two second alignment modules 44 that are mounted on the carrying module 42 and that are spaced apart from each other in the first direction. The weighing module 41 includes four load cells 411 (only two of them can be seen in FIGS. 6 and 7) that are mounted on the main body 31 symmetrically in the first direction and the second direction.

The carrying module 42 includes a carrying base 421 that is mounted on the weighing module 41 (i.e., disposed on the load cells 411), and a transport component 422 that is mounted on the carrying base 421 and that is disposed between the entrance 312 and the exit 311. The transport component 422 is configured to carry the solar panel module 9 which is placed into the inner space 310 through the entrance 312, and is configured to transport the solar panel module 9 toward the exit 311. The weighing module 41 is configured to measure the weight of an object (e.g., the solar panel module 9) carried by the carrying module 42 using the load cells 411, and to obtain weight data of the solar panel module 9 based on the weight thus measured.

In the first embodiment, the transport component 422 includes two conveyor belts 423 that are spaced apart in the second direction and that extend in the first direction, a plurality of supporting frames 424 that are disposed on the carrying base 421, that are spaced apart in the second direction, and that are arranged along the first direction, and a third driving component 425 that is electrically connected to the control unit 7 and that is configured to be controlled by the control unit 7 to drive the conveyor belts 423 to operate for transporting the solar panel module 9 toward the exit 311. The supporting frames 424 are disposed below and abut against the upper-half portion of the conveyor belts 423 so as to maintain the conveyor belts 423 at a predetermined height level when the solar panel module 9 is placed onto the conveyor belts 423. In other embodiments, the transport component 422 may include a roller conveyor that includes a plurality of rollers each of which extends in the second direction and is arranged in the first direction. Since the two types of the transport component 422 mentioned above are well-known to one having ordinary skill in the art, and may be realized in various forms, they will not be described in further detail for the sake of brevity, and the disclosure should not be limited to the abovementioned examples. In this embodiment, the third driving component 425 may at least include an electric motor, a pneumatic actuator (e.g., a pneumatic motor), a hydraulic cylinder, or any other actuators capable of driving the conveyor belts 423 to operate.

Figure 6:
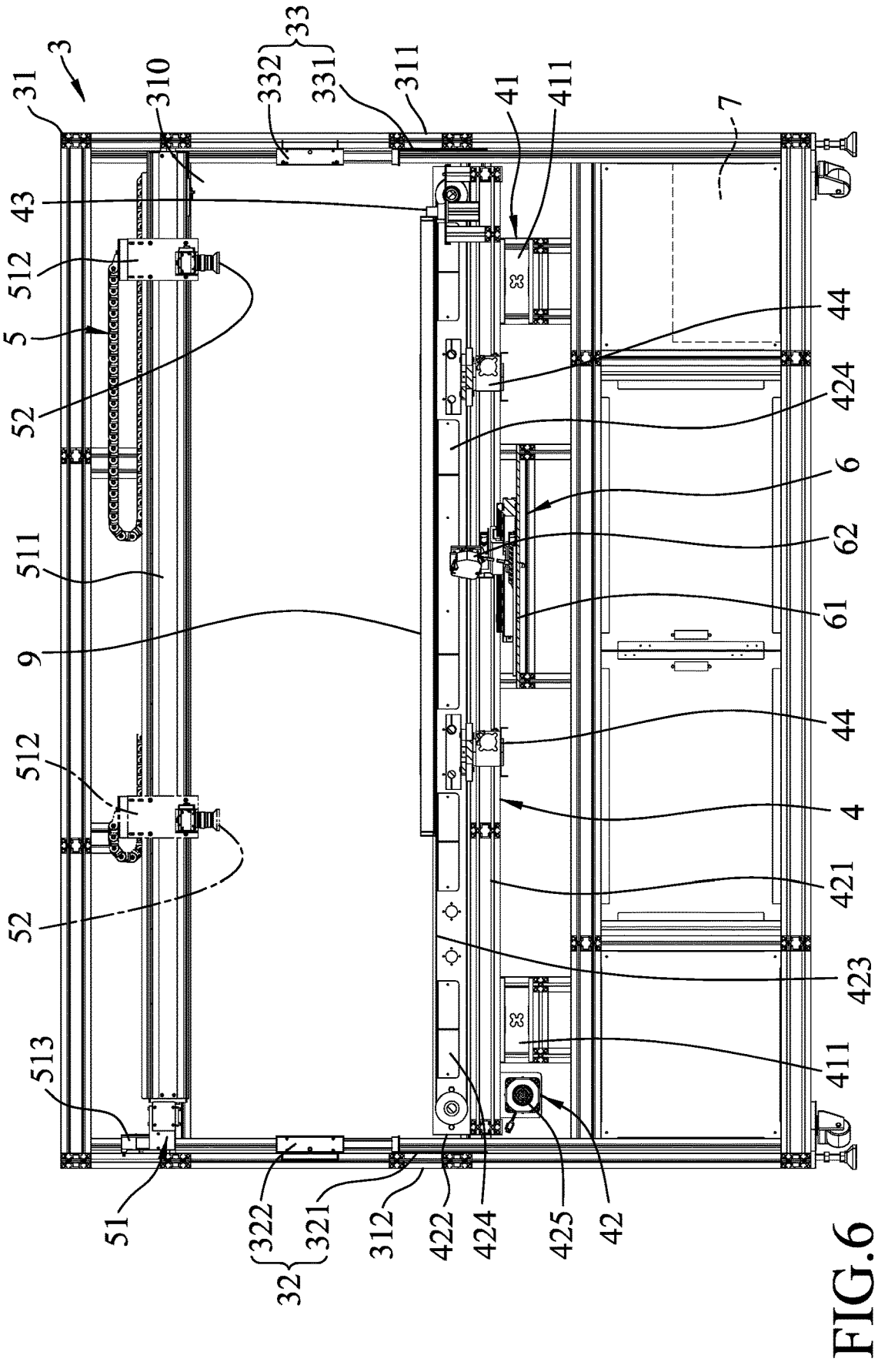
FIG. 6 is a side view of the analyzing system of the first embodiment, where the solar panel module is disposed in an inner space of the analyzing system.
Figure 7:
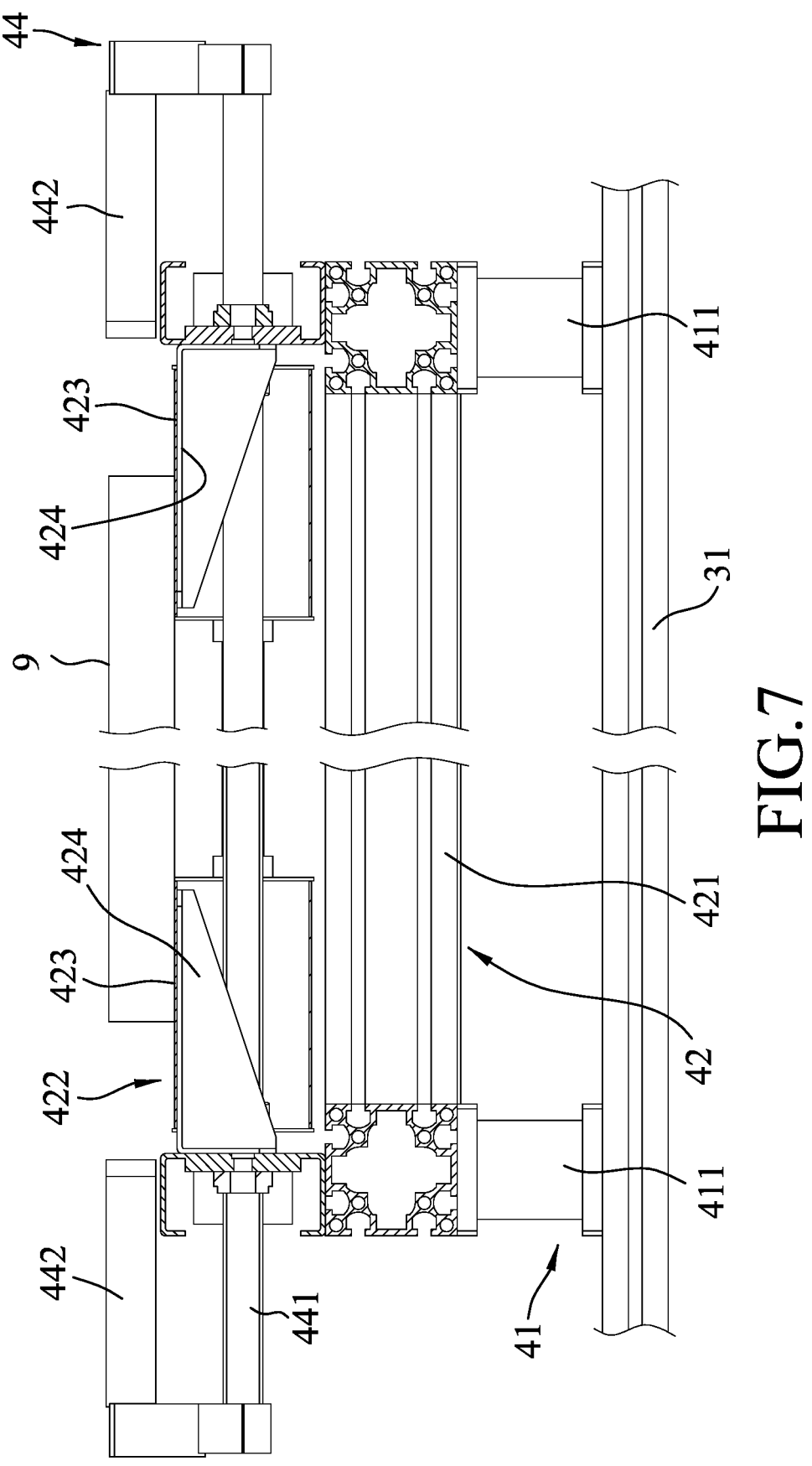
FIG. 7 is a fragmentary side view illustrating a transport component of the analyzing system according to the first embodiment of the disclosure.
Figure 9:
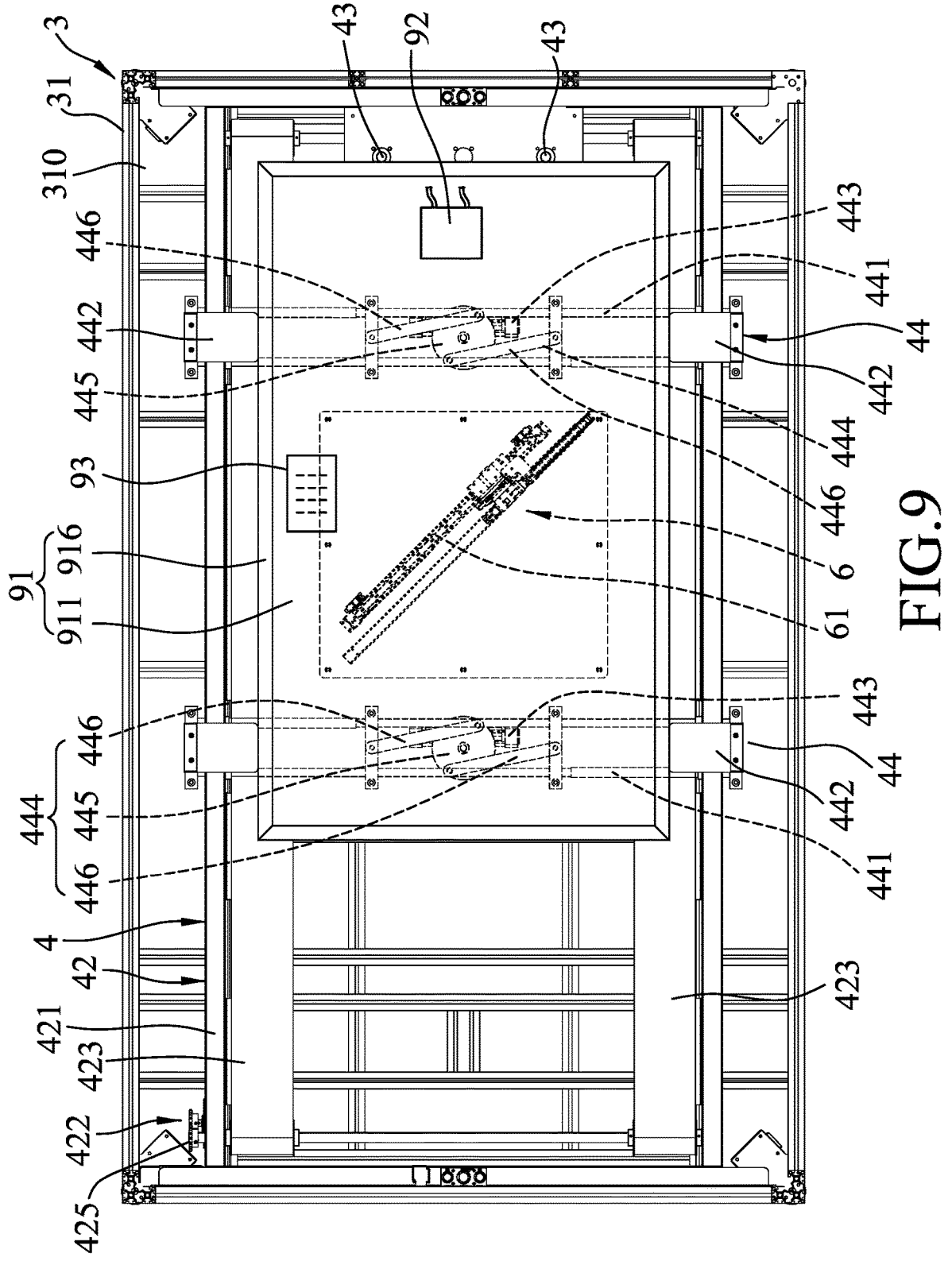
FIG. 9 is a top view of the analyzing system where the solar panel module is disposed in the inner space of the analyzing system according to the first embodiment of the disclosure.

Referring to FIGS. 3, 6, and 9, the first alignment modules 43 are mounted on one end of the carrying base 421 that is adjacent to and inside the exit 311. Each of the first alignment modules 43 is configured to be controlled by the control unit 7 to switch between a blocking position and a release position. The first alignment modules 43 in the blocking position block the solar panel module 9 from moving through the exit 311 so as to make the solar panel module 9 abut against the first alignment modules 43 and thus align the solar panel module 9 with the exit 311, and the first alignment modules 43 in the release position allow the solar panel module 9 to move through the exit 311.

In the first embodiment, each of the first alignment modules 43 may be a telescopic cylinder that is configured to extend upward in the up-down direction so as to move to the blocking position and to retract downward in the up-down direction so as to move to the release position. It should be noted that the first alignment modules 43 may have different structural configurations and move in various ways, such as swinging up and down between the blocking position and the release position, and the first alignment modules 43 should not be limited to the abovementioned example.

Figure 8:
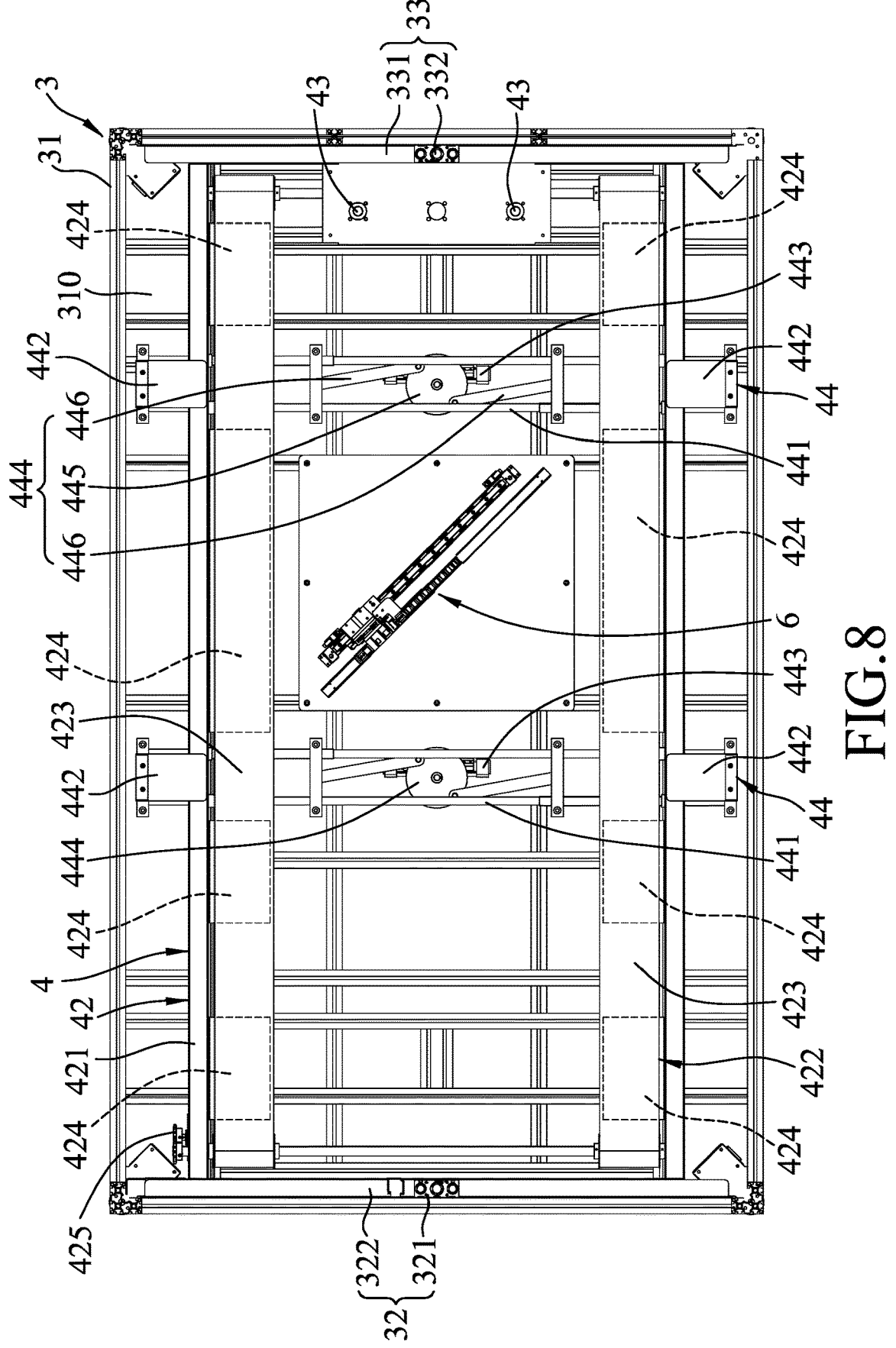
FIG. 8 is a top view of the analyzing system according to the first embodiment of the disclosure.

Referring to FIGS. 3, 8, and 9, each of the second alignment modules 44 includes a guiding component 441 that is mounted on the carrying base 421 and that extends in the second direction, two pushing components 442 that are mounted respectively on two opposite ends of the guiding component 441 and that are configured to move along the guiding component 441 in the second direction, a fourth driving component 443 that is mounted on the carrying base 421, and a connecting component 444 that is connected between the fourth driving component 443 and each of the pushing components 442. The connecting component 444 includes a rotating base 445 and two connecting rods 446. The rotating base 445 is mounted on the carrying base 421, and is configured to be driven by the fourth driving component 443 to rotate horizontally on an imaginary plane perpendicular to the up-down direction. The two connecting rods 446 are connected respectively to the pushing components 442. Each of the connecting rods 446 has one end eccentrically and pivotally connected to the rotating base 445 in a radially symmetrical manner, and another end pivotally connected to the corresponding one of the pushing components 442. In this embodiment, the fourth driving component 443 may at least include an actuator (for example, an electric motor, a pneumatic actuator (e.g., a pneumatic motor), a hydraulic cylinder, or any other actuators capable of driving the rotating base to rotate), and a gear set connected between the actuator and the rotating base 445.

For each of the second alignment modules 44, the fourth driving component 443 is configured to be controlled by the control unit 7 to drive the rotating base 445 to rotate horizontally, so as to drive the connecting rods 446 to displace in opposite directions along the second direction, thus driving the pushing components 442 to either move toward each other or recede away from each other along the guiding component 441. When the pushing components 442 of the second alignment module 44 are simultaneously moved by the connecting component 444 to move toward each other, the pushing components 442 cooperatively push the solar panel module 9 that is on the transport component 422 to align with the first direction (see FIG. 9).

Figure 10:
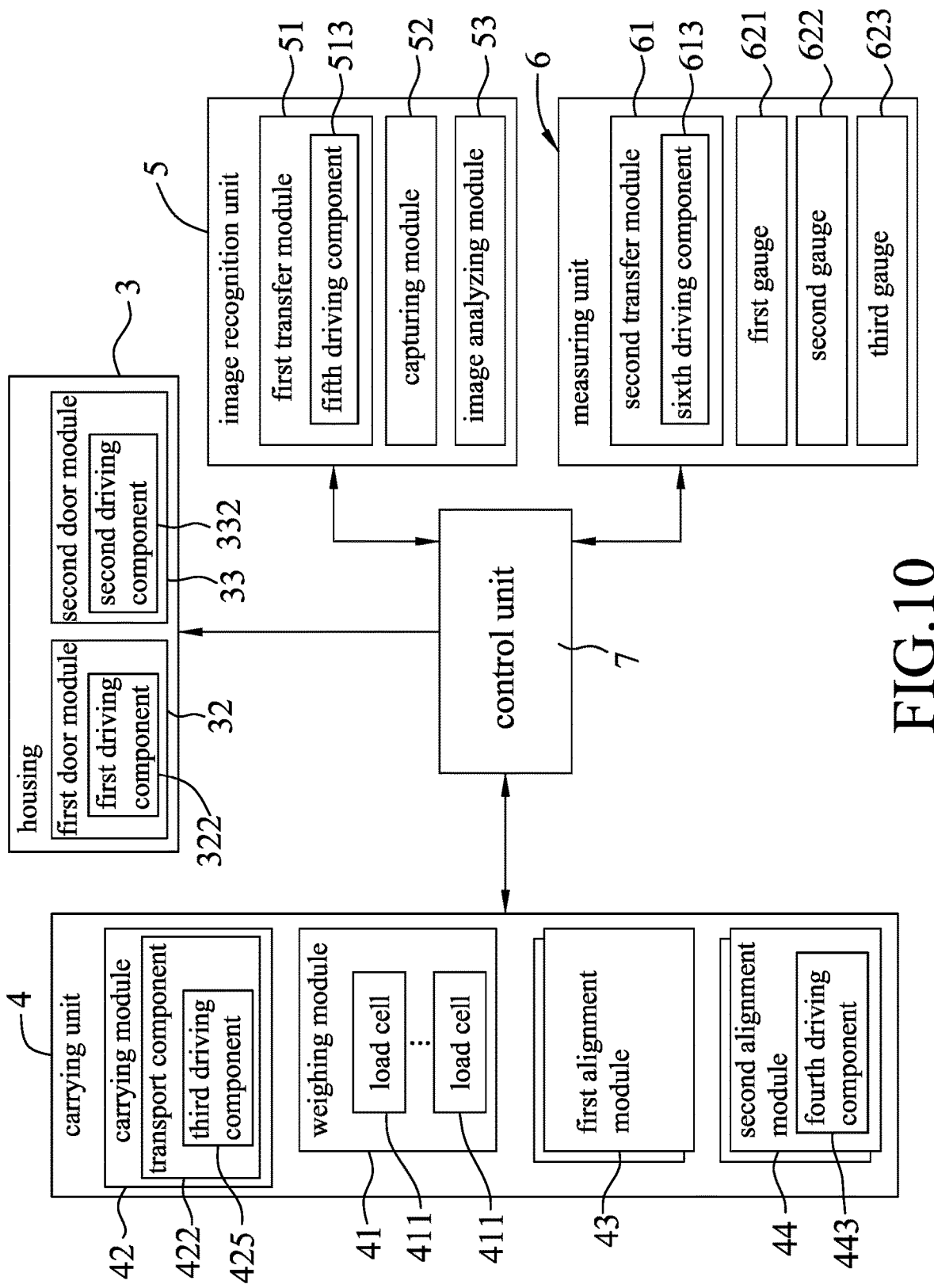
FIG. 10 is a block diagram of the analyzing system according to the first embodiment of the disclosure.

Referring to FIGS. 3, 6, and 10, the image recognition unit 5 includes a first transfer module 51, a capturing module 52, and an image analyzing module 53. The first transfer module 51 is mounted on the main body 31, is disposed above the transport component 422, and is configured to move relative to the transport component 422. The capturing module 52 is mounted on the first transfer module 51, and the image analyzing module 53 is electrically connected to the capturing module 52.

The first transfer module 51 includes a first slide rail 511, a first moving base 512 and a fifth driving component 513. The first slide rail 511 is mounted on the main body 31 and extends in the first direction. The first moving base 512 is disposed on the first slide rail 511 and is configured to slide along the first slide rail 511, and the capturing module 52 is disposed on the moving base 512. The fifth driving component 513 is connected to the first moving base 512, and is configured to be controlled by the control unit 7 to drive the first moving base 512 to move along the first slide rail 511 in the first direction so as to move the capturing module 52 relative to the carrying module 42. In this embodiment, the fifth driving component 513 may at least include an electric motor, a pneumatic actuator (e.g., a pneumatic motor), a hydraulic cylinder, or any other actuators capable of driving the first moving base 512 to move.

The capturing module 52 is configured to be controlled by the control unit 7 to, while moving relative to the carrying module 42 that is carrying the solar panel module 9, point downward at the solar panel module 9 to capture multiple images of different portions of the solar panel module 9 that is disposed on the transport component 422. The different portions of the solar panel module 9 captured by the capturing module 52 may partially overlap with each other. The capturing module 52 may be, for example, a camera.

The image analyzing module 53 is integrated with the control unit 7 and is configured to construct an image of a top surface of the solar panel module 9 (hereinafter referred to as "top solar panel image") based on the images of the different portions of the solar panel module 9, and to obtain an image of the product label 93 (hereinafter referred to as "product label image") from the top solar panel image. In some embodiments, the image analyzing module 53 obtains the product label image by the capturing module 52 directly capturing the product label 93. The image analyzing module 53 is further configured to process the top solar panel image to obtain solar panel module data that includes solar panel dimension data (e.g., a length and a width of the solar panel module 9), junction box dimension data (e.g., a size of the junction box 92), position data of the junction box 92 (e.g., a position of the junction box 92 on the solar panel module 9), and frame dimension data (e.g., a length and a width of the frame 94). The image analyzing module 53 is further configured to perform character recognition for the product label image so as to obtain product information related to the product label 93 of the solar panel module 9. In this embodiment, the product information is printed on the product label 93, and the product information may include, but is not limited to, a brand name, a model number, a place of production, or a power specification of the solar panel module 9.

The described operations of the image analyzing module 53 may be implemented as a method, apparatus or computer readable storage medium using standard programming and/or engineering techniques to produce software, firmware, hardware, or any combination thereof. The described operations may be implemented as program codes stored in a computer readable storage medium.

The computer readable storage medium may include, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMS, PROMs, RAMS, DRAMs, SRAMs, Flash Memory, firmware, programmable logic, etc.), Solid State Devices (SSD), etc. The program code stored in the computer readable storage medium may be read and executed by a processor to implement the operations of the image analyzing module 53, and the processor may include a single core processor, a multi-core processor, a dual-core mobile processor, a microprocessor, a microcontroller, a digital signal processor (DSP), a programmable gate array (PGA), a field-programmable gate array (FPGA), an application specific integrated circuit (ASIC), and/or a radio-frequency integrated circuit (RFIC), etc.

Figure 11:
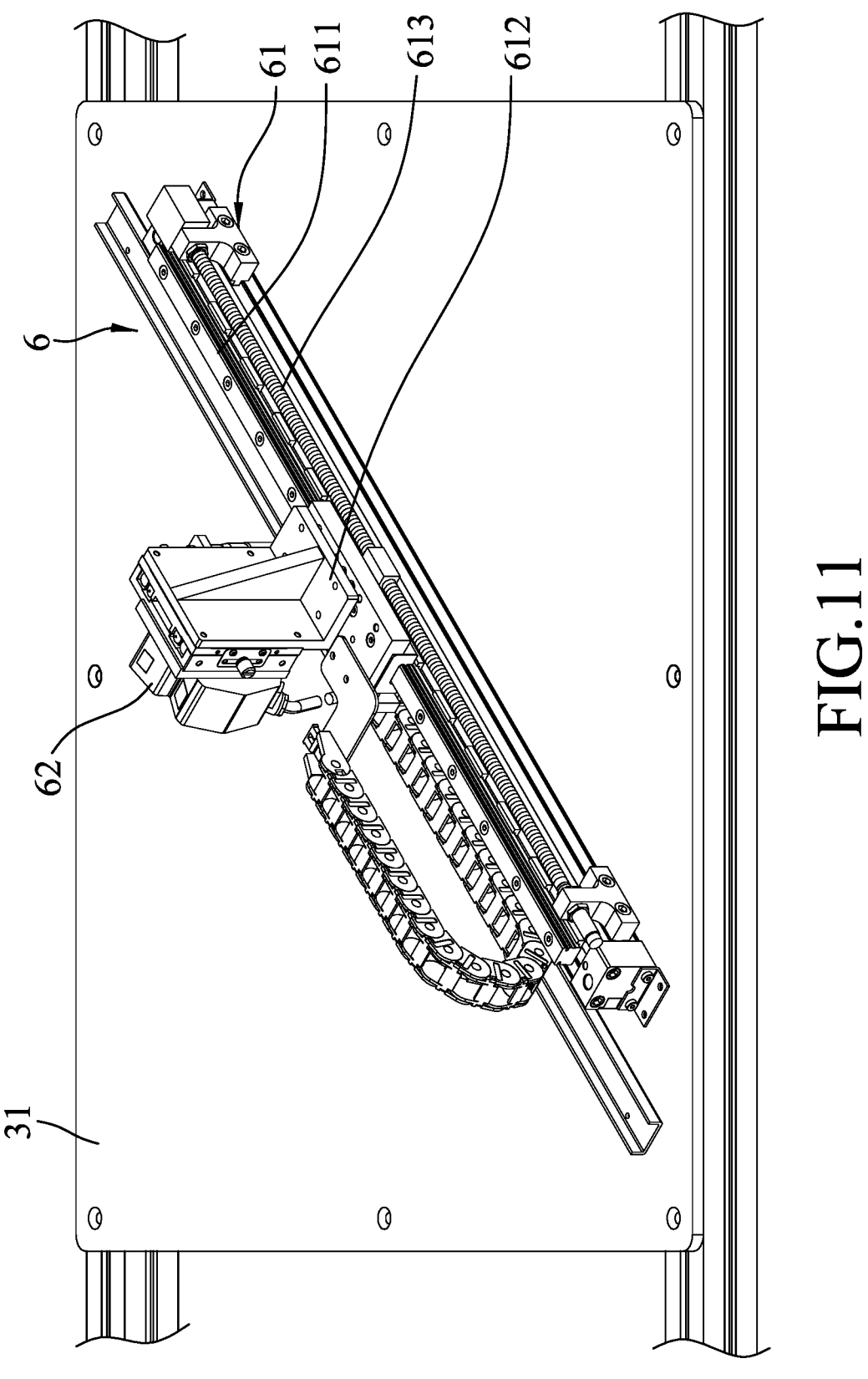
FIG. 11 is a fragmentary perspective view illustrating a measuring unit of the analyzing system according to the first embodiment of the disclosure.

Referring to FIGS. 3, 9, and 11, the measuring unit 6 includes a second transfer module 61 that is mounted on the main body 31 and that is disposed below the carrying unit 4, and a measuring module 62 that is mounted on the second transfer module 61. The second transfer module 61 includes a second slide rail 611, a second moving base 612 and a sixth driving component 613. The second slide rail 611 is mounted on the main body 31 and horizontally extends in an oblique direction that deviates from the first direction and the second direction and that is perpendicular to the up-down direction; specifically, the second slide rail 611 extends from one of the pushing components 442 of one of the second alignment modules 44 toward one of the pushing components 442 of the other one of the second alignment modules 44, where said one of the pushing components 442 of said one of the second alignment modules 44 and said one of the pushing components 442 of said the other one of the second alignment modules 44 are disposed on opposite sides in the second direction. The second moving base 612 is disposed slidably on the second slide rail 611. The sixth driving component 613 is mounted on the main body 31, is connected to the second moving base 612, and is configured to drive the second moving base 612 to move along the second slide rail 611. In this embodiment, the sixth driving component 613 may be a linear actuator including a lead-screw and a motor (e.g., a step motor). In other embodiments, the sixth driving component 613 may include a pneumatic actuator (e.g., a pneumatic motor), a hydraulic cylinder, or any other actuators capable of driving the second moving base 612 to move.

In the first embodiment, a diagonal line of one of the solar cells 912 is parallel to the extension direction of the second slide rail 611 (i.e., the oblique direction) when the solar panel module 9 is aligned with the first direction (see FIG. 9). The sixth driving component 613 is configured to drive the second moving base 612 to move along the second slide rail 611 in the oblique direction so as to drive the measuring module 62 to move relative to the carrying module 42. As such, when the solar panel module 9 is disposed on the carrying module 42, the measuring module 62 may be driven to move diagonally across the solar cells 912. In the first embodiment, the measuring module 62 is driven to move across at least two diagonally arranged solar cells 912.

Referring to FIGS. 2, 9, and 10, the measuring module 62 is configured to obtain solar panel structure data that includes a thickness (D1) of the cover layer 914 (hereinafter referred to as "first thickness"), a thickness (D2) between a light-receiving surface of one of the solar cells 912 that faces the cover layer 914 and an illuminated surface of the cover layer 914 that is adjacent to the carrying module 42 (hereinafter referred to as "second thickness"), and a thickness (D3) between a bonded surface of the base layer 913 that is adjacent to the adhesive layer 915 and the illuminated surface of the cover layer 914 (hereinafter referred to as "third thickness"). The measuring module 62 is configured to perform optical measurements for measuring the solar panel 91 so as to obtain the solar panel structure data, and includes a first gauge 621, a second gauge 622, and a third gauge 623 that are disposed at the same reference height in the up-down direction.

The first gauge 621 is configured to measure the first thickness (D1). In the first embodiment, the first gauge 621 measures the first thickness (D1) using confocal laser scanning technology by emitting a laser beam (e.g., an ultraviolet (UV) laser beam) with a first predetermined power upwardly to the solar panel 91. In some embodiments, the first gauge 621 is configured to measure the first thickness (D1) when the measuring module 62 is moving horizontally across at least two of the solar cells 912. When the first gauge 621 emits the laser beam so that the laser beam travels upward and hits the cover layer 914, the laser beam would be partly reflected by the illuminated surface of the cover layer 914, and would partly pass through the cover layer 914. Then, the laser beam passing through the cover layer 914 has a part that would be completely absorbed by the adhesive layer 915, and a part that would be reflected by a bonded surface of the cover layer 914 that is adjacent to the adhesive layer 915. The first gauge 621 is configured to measure a time difference between the first gauge 621 receiving the laser beam reflected by the illuminated surface of the cover layer 914 and the first gauge 621 receiving the laser beam reflected by the interface between the cover layer 914 and the adhesive layer 915. As such, the first gauge 621 may obtain the first thickness (D1) of the cover layer 914 based on the time difference thus measured, specifically, by multiplying speed of light and the time difference, and then dividing by two. In some embodiments, the first gauge 621 is configured to make multiple measurements on the time difference while moving horizontally, to obtain a plurality of thicknesses of the cover layer 914 based on the time differences thus measured, and to obtain an average of the plurality of thicknesses as the first thickness (D1) of the cover layer 914.

The third gauge 623 is configured to measure a distance (D0) between the illuminated surface of the cover layer 914 and the third gauge 623 (hereinafter referred to as "first distance"), and to transmit the first distance (D0) to the second gauge 622. In the first embodiment, the third gauge obtains the first distance (D0) using chromatic confocal imaging technology in a similar manner as the first gauge 621 measuring the first thickness (D1). However, instead of measuring a time difference, the third gauge 623 measures a time length from emitting the laser beam to receiving the laser beam reflected by the illuminated surface of the cover layer 914. As such, the third gauge 623 may obtain the first distance (D0) based on the time thus measured. The way of obtaining the first distance (D0) should not be limited to the abovementioned example.

The second gauge 622 is configured to measure, using optical measurement technologies, a distance (D2') between the second gauge 622 and the light-receiving surface of one of the solar cells 912 (hereinafter referred to as "second distance"), and a distance (D3') between the second gauge 622 and the bonded surface of the base layer 913 (hereinafter referred to as "third distance").

The second gauge 622 is further configured to obtain the third thickness (D3) between the illuminated surface of the cover layer 914 and the bonded surface of the base layer 913 based on the first distance (D0) and the third distance (D3'), and to obtain the second thickness (D2) between the illuminated surface of the cover layer 914 and the light-receiving surface of one of the solar cells 912 based on the first distance (D0) and the second distance (D2').

In the first embodiment, the second gauge 622 is configured to be controlled by the control unit 7 to measure the third distance (D3') by emitting a first infrared light with a first power while moving horizontally across at least two of the solar cells 912, and to measure the second distance (D2') by emitting a second infrared light with a second power while moving horizontally across at least two of the solar cells 912. It should be noted that the second power of the second infrared light is greater than the first power of the first infrared light.

In one example, the first power of the first infrared light is designed so that the first infrared light is able to be completely absorbed by the solar cells 912 (i.e., without being reflected by the solar cells 912) and to pass through one of the gaps among the solar cells 912 toward the base layer 913. The second power of the second infrared light is designed so that the second infrared light is not completely absorbed by the solar cells 912 (i.e., the second infrared light is partly absorbed and partly reflected by the solar cells 912), and the second infrared light is able to pass through the adhesive layer 915 and through one of the gaps among the solar cells 912 toward the base layer 913 and be reflected by the bonded surface of the base layer 913.

When the second gauge 622 emits the first infrared light, the first infrared light travels upward and passes through the cover layer 914 to reach the solar cells 912. When the first infrared light hits one of the solar cells 912, the first infrared light would be completely absorbed by the one of the solar cells 912 without being reflected. When the first infrared light passes through one of the gaps among the solar cells 912, the first infrared light may hit the base layer 913 and be reflected by the bonded surface of the base layer 913 and then be received by the second gauge 622.

When the second gauge 622 emits the second infrared light, the second infrared light travels upward and passes through the cover layer 914 to reach the solar cells 912. Since the second power of the second infrared light is greater than the first power of the first infrared light and the second infrared light is unable to be completely absorbed by the solar cells 912, the second infrared light would be partly absorbed and partly reflected by the one of the solar cells 912 when the second infrared light hits one of the solar cells 912, and thus the second gauge 622 may receive the second infrared light reflected by the light-receiving surface of the one of the solar cells 912. When the second infrared light passes through one of the gaps among the solar cells 912 and through the adhesive layer 915, the second infrared light may hit the base layer 913 and be reflected by the bonded surface of the base layer 913. In the first embodiment, the amount of the second infrared light reflected by the base layer 913 that is received by the second gauge 622 is outside the measureable range of the second gauge 622 and would be considered by the second gauge 622 as noise (i.e., only a part of the second infrared light reflected by the solar cells 912 is measured by the second gauge 622).

The second gauge 622 is configured to collect reflection time data of the first infrared light so as to obtain the third distance (D3'), and is further configured to obtain the third thickness (D3) between the illuminated surface of the cover layer 914 and the bonded surface of the base layer 913 by subtracting the first thickness (D0) from the third distance (D3'). The reflection time data of the first infrared light at least includes a length of time counting from the time point when the second gauge 622 emits the first infrared light to the time point when the second gauge 622 receives the first infrared light reflected by the bonded surface of the base layer 913.

The second gauge 622 is configured to collect reflection time data of the second infrared light so as to obtain the second distance (D2'), and is further configured to obtain the second thickness (D2) between the illuminated surface of the cover layer 914 and the light-receiving surface of one of the solar cells 912 by subtracting the first thickness (D0) from the second distance (D2'). The reflection time data of the second infrared light at least includes a length of time counting from the time point when the second gauge 622 emits the second infrared light to the time point when the second gauge 622 receives the second infrared light reflected by one of the solar cells 912.

The control unit 7 is electrically connected to and configured to control operation of the first door module 32, the second door module 33, the weighing module 41, the carrying module 42, the first alignment module 43, the second alignment module 44, the image recognition unit 5, and the measuring unit 6. The control unit 7 is further configured to construct measurement data related to the solar panel module 9, and the measurement data includes the weight data measured by the weighing module 41, the solar panel module data and the product information obtained by the image analyzing module 53, and the solar panel structure data obtained by the measuring module 62 (i.e., the first thickness (D1), the second thickness (D2), and the third thickness (D3)).

In the first embodiment, two second alignment modules 44 are mounted on the carrying module 42 and are arranged in the first direction, and two first alignment modules 43 are mounted on one end of the carrying module 42 adjacent to the exit 311. In some embodiments, there may only be one second alignment module 44 mounted on the carrying module 42, in such case, the second alignment module 44 is extended in length in the first direction so that the second alignment module 44 is capable of pushing the solar panel module 9 that is on the transport component 422 to align with the first direction. Similarly, in some embodiments, there may be only one first alignment module 43 mounted on one end of the carrying module 42 adjacent to the exit 311 for aligning the solar panel module 9 with the exit 311. In some embodiments, the first alignment module 43 and the second alignment modules 44 may be omitted, and the solar panel module 9 that is placed into the inner space 310 may be properly positioned by the carrying module 42. To describe in further detail, the carrying module 42 is configured to move the solar panel module 9 to and stop at a position in the inner space 310 where the image recognition unit 5 may capture images of the solar panel module 9 and the measuring unit 6 may make measurements of the solar panel module 9.

In the first embodiment, the solar panel module 9 is placed into the inner space 310 with the base layer 913 facing upward, and the image recognition unit 5 and the measuring unit 6 are respectively disposed above and below the carrying module 42. In some embodiments, the solar panel module 9 may be placed into the inner space 310 with the cover layer 914 facing upward (i.e., opposite to the orientation in the first embodiment), and the position of the image recognition unit 5 and the position of the measuring unit 6 may be switched accordingly (i.e., the image recognition unit 5 being disposed below the carrying module 42 and the measuring unit 6 being disposed above the carrying module 42).

Figure 12:
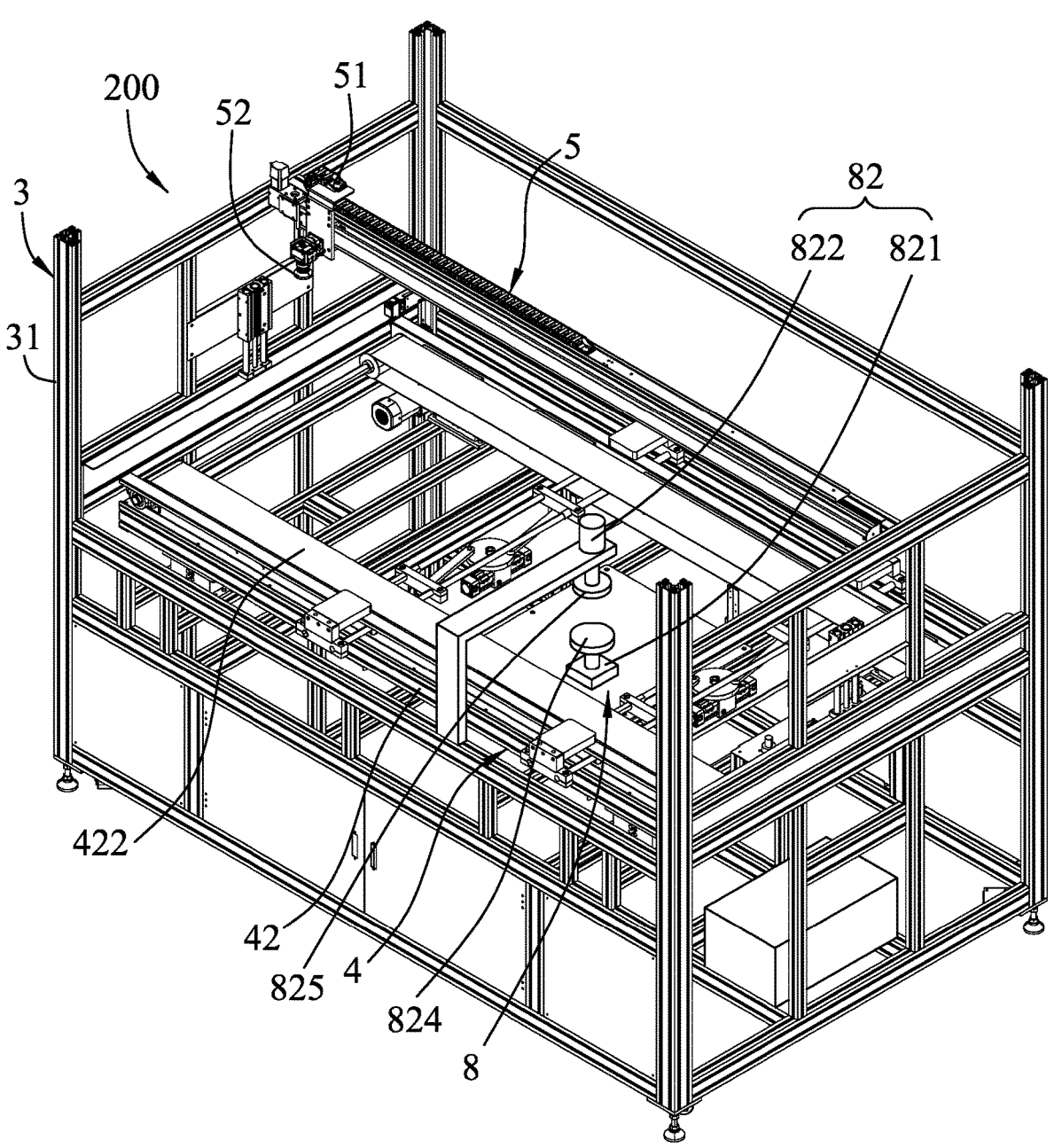
FIG. 12 is a perspective view of an analyzing system for identifying and measuring a solar panel module according to a second embodiment of the disclosure.
Figure 13:
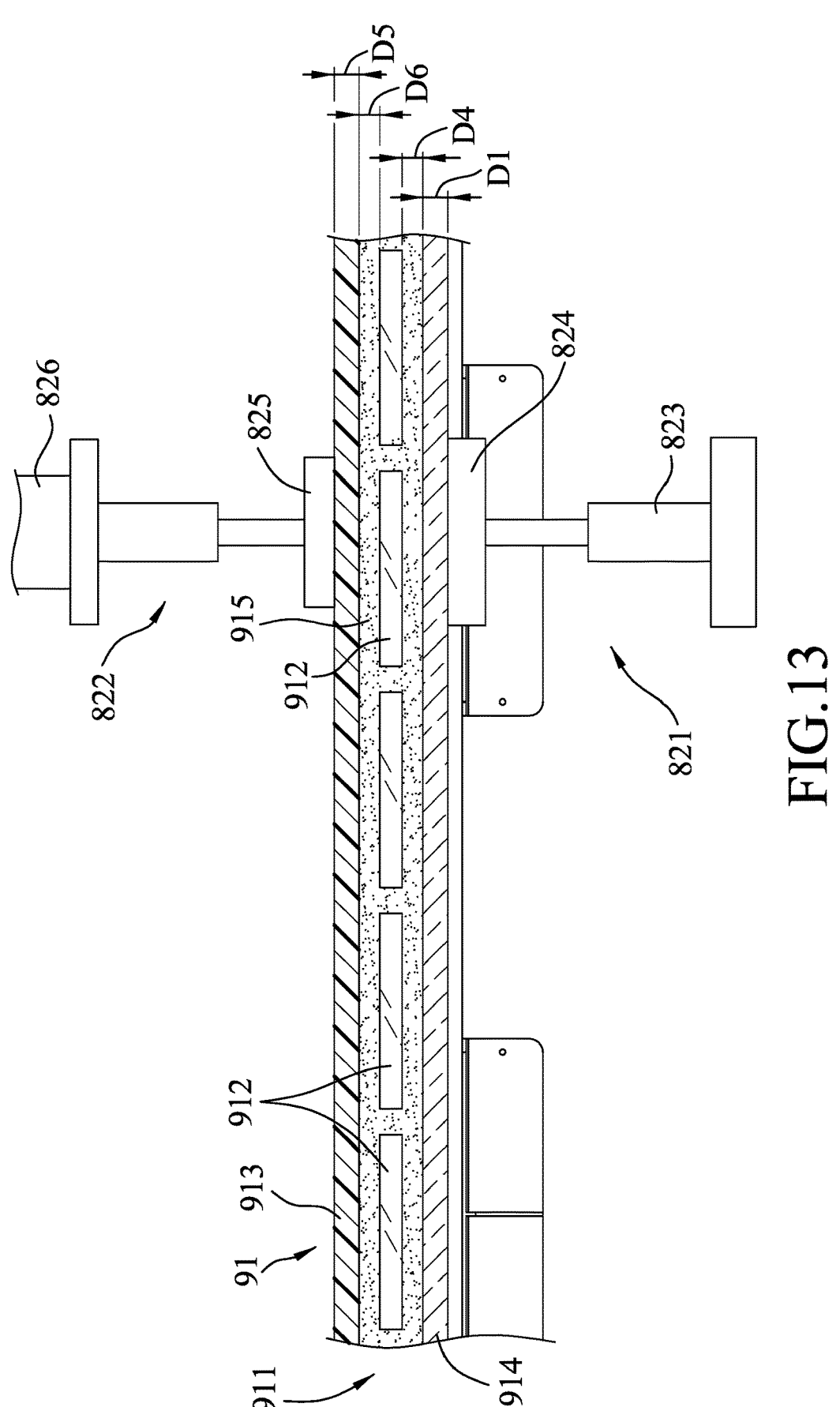
FIG. 13 is a schematic view illustrating a measuring module for measuring various layers of the solar panel module according to the second embodiment of the disclosure.

Referring to FIGS. 12 and 13, the analyzing system 200 according to a second embodiment of the disclosure is provided. The analyzing system 200 of the second embodiment includes the housing 3, the carrying unit 4, the image recognition unit 5, and the control unit 7 that are similar to those of the first embodiment, and a measuring unit 8 that is different from the measuring unit 6 in the first embodiment. In the following description, only the difference between the measuring unit 8 of this embodiment and the measuring unit 6 of the first embodiment will be described in detail for the sake of brevity.

In the second embodiment, the measuring unit 8 includes a measuring module 82 that is mounted on the main body 31. The measuring module 82 includes a first gauge 821 that is disposed below the transport component 422, and a second gauge 822 that is disposed above the transport component 422.

The first gauge 821 includes a first telescopic cylinder 823, and a first ultrasonic probe 824 that is disposed on the first telescopic cylinder 823 and that is pointing upward to the carrying module 42. The first telescopic cylinder 823 is configured to be controlled by the control unit 7 to extend upward so as to make the first ultrasonic probe 824 abut against the illuminated surface of the cover layer 914. The first ultrasonic probe 824 is configured to emit an ultrasonic wave with a second predetermined power to the solar panel 91 so as to measure the first thickness (D1) of the cover layer 914, and to measure a thickness (D4) between the bonded surface of the cover layer 914 and the light-receiving surface of one of the solar cells 912 (hereinafter referred to as "fourth thickness"), both using ultrasonic thickness measurement technology.

The second gauge 822 includes a second telescopic cylinder 826, and a second ultrasonic probe 825 that is disposed on the second telescopic cylinder 826 and that is pointing downward to the carrying module 42. The second telescopic cylinder 826 is configured to be controlled by the control unit 7 to extend downward so as to make the second ultrasonic probe 825 abut against the base surface of the base layer 913 that is further away from the cover layer 914. The second ultrasonic probe 825 is configured to emit an ultrasonic wave with a third predetermined power to the solar panel 91 so as to measure a thickness (D5) of the base layer 913 (hereinafter referred to as "fifth thickness"), and to measure a thickness (D6) between the bonded surface of the base layer 913 and a non-light-receiving surface of one of the solar cells 912 that faces the base layer 913 (hereinafter referred to as "sixth thickness"), both using ultrasonic thickness measurement technology.

As such, in the second embodiment, the solar panel structure data may include the first thickness (D1), the fourth thickness (D4), the fifth thickness (D5), and the sixth thickness (D6) that are obtained using the first gauge 821 and the second gauge 822.

In some embodiments, the first gauge 821 may measure the first thickness (D1) using sound waves, eddy currents, etc. It should be noted that ways of measuring the first thickness (D1) by the first gauge 821 are not limited to the abovementioned examples.

In summary, the arrangement of the carrying unit 4, the image recognition unit 5, and the measuring unit 6, 8 allows the analyzing system 200 to automatically obtain the measurement data that includes the weight data, the solar panel module data (e.g., the solar panel dimension data, the junction box dimension data, the position data of the junction box 92, and the frame dimension data), the product information, and the solar panel structure data (e.g., D1 to D3, or D1 and D4 to D6). As such, the measurement data may be provided to a recycling system that physically recycles solar panel modules. The recycling system may search for processing parameters in a database for recycling based on the product information, where the processing parameters correspond to the solar panel module 9, may remove the frame 94 and the junction box 92 of the solar panel module 9 based on the solar panel module data of the solar panel module 9, and may remove different layers of the solar panel module 9 based on the solar panel structure data of the solar panel module 9. The recycling system may further calculate a recycled ratio (e.g., a total weight of the recycled materials obtained from the solar panel module 9 divided by the weight of the solar panel module 9 before being processed by the recycling system) based on the weight data.

Furthermore, in some embodiments where the analyzing system 200 includes the first alignment module 43 and the second alignment module 44, the arrangement of the first alignment module 43 and the second alignment module 44 allows the solar panel module 9 that are placed into the inner space 310 to be properly aligned, thus increasing accuracy of the various measurements of the solar panel module 9.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An analyzing system for identifying and measuring a solar panel module, the solar panel module including a solar panel and a product label that is attached on the solar panel, said analyzing system comprising:

a housing;

a carrying unit including a weighing module that is mounted on said housing, and a carrying module that is mounted on said weighing module and that is configured to carry the solar panel module placed into said housing, wherein said weighing module is configured to measure a weight of the solar panel module that is carried by said carrying module; and an image recognition unit including a first transfer module that is mounted on said housing and that is configured to move relative to said carrying module, a capturing module that is mounted on said first transfer module and that is configured to be driven by said first transfer module to move relative to said carrying module and, while moving relative to said carrying module that is carrying the solar panel module, to capture an image of the solar panel module, and an image analyzing module that is electrically connected to said capturing module and that is configured to process the image captured by said capturing module to obtain dimension data and product information of the solar panel module, the product information being related to the product label.

2. The analyzing system as claimed in claim 1, the solar panel including a base layer, a cover layer, and a solar cell unit that is sandwiched between the base layer and the cover layer, the solar cell unit including an adhesive layer that is bonded to the cover layer and the base layer, and a plurality of solar cells that are embedded in the adhesive layer and that are arranged horizontally in a matrix and spaced apart from each other, said analyzing system further comprising:

a measuring unit including a second transfer module and a measuring module that is mounted on said second transfer module, said second transfer module being configured to drive said measuring module to move relative to said carrying module, said measuring module being configured to obtain solar panel structure data including a first thickness of the cover layer, a second thickness between a light-receiving surface of one of the solar cells that faces the cover layer and an illuminated surface of the cover layer that is adjacent to said carrying module, and a third thickness between a bonded surface of the base layer that is adjacent to the adhesive layer and the illuminated surface of the cover layer.

3. The analyzing system as claimed in claim 2, wherein:

said housing surrounds and defines an inner space therein, the inner space has an entrance at a first side of the inner space, and an exit at a second side of the inner space opposite to the first side;

said carrying module includes a carrying base that is mounted on said weighing module, and a transport component that is mounted on said carrying base, that is configured to carry the solar panel module which is placed into the inner space through the entrance, and that is configured to transport the solar panel module toward the exit; and said carrying unit further includes a first alignment module that is mounted on one end of said carrying base adjacent to the exit, that is disposed inside the exit, and that is configured to switch between a blocking position and a release position, where said first alignment module in the blocking position blocks the solar panel module from moving through the exit so as to make the solar panel module abut against said first alignment module and thus align the solar panel module with the exit, and said first alignment module in the release position allows the solar panel module to move through the exit.

4. The analyzing system as claimed in claim 3, wherein the first side and the second side of the inner space are opposite to each other in a first direction, said carrying unit further includes a second alignment module that is mounted on said housing and that includes:

a guiding component that is mounted on said housing and that extends in a second direction perpendicular to the first direction;

two pushing components that are mounted on said guiding component and that are configured to move along said guiding component;

a connecting component that is disposed between and connected to said pushing components; and a driving component that is mounted on said housing, that is connected to said connecting component, and that is configured to drive said connecting component to simultaneously move said pushing components to move toward each other along said guiding component, so as to cooperatively push the solar panel module that is on said transport component to align with the first direction.

5. The analyzing system as claimed in claim 4, wherein said connecting component includes:

a rotating base that is mounted on said housing, that is connected to said driving component, and that is configured to rotate horizontally; and two connecting rods connected respectively to said pushing components, each of said connecting rods having one end eccentrically and pivotally connected to said rotating base in a radially symmetrical manner, and another end pivotally connected to one of said pushing components, wherein said rotating base is configured to be driven by said driving component to rotate horizontally, so as to drive said connecting rods to displace in opposite directions along the second direction, thus driving said pushing components to move in one of a first manner where said pushing components move toward each other, and a second manner where said pushing components recede away from each other.

6. The analyzing system as claimed in claim 3, wherein said housing includes:

a main body that surrounds and defines the inner space and that has a first side and a second side corresponding respectively to the first side and the second side of the inner space;

a first door module that is mounted on the first side of said main body and that is controllable to openably close the entrance; and a second door module that is mounted on the second side of said main body and that is controllable to openably close the exit.

7. The analyzing system as claimed in claim 2, wherein said measuring module is configured to perform optical measurement for measuring said solar panel to obtain the solar panel structure data.

8. The analyzing system as claimed in claim 7, the solar panel being disposed in a manner with the base layer facing upward, wherein said measuring unit is disposed below said carrying module and includes:

a first gauge that is configured to measure the first thickness of the cover layer using confocal laser scanning technology while moving horizontally across at least two of the solar cells;

a second gauge that is configured to measure a first distance to the bonded surface of the base layer by emitting a first infrared light upwardly with a first power while moving horizontally across at least two of the solar cells, to measure a second distance to the light-receiving surface of one of the solar cells by emitting a second infrared light upwardly with a second power while moving horizontally across at least two of the solar cells, wherein the second power is greater than the first power; and a third gauge that is configured to measure a third distance between the illuminated surface of the cover layer and said third gauge using chromatic confocal imaging technology, wherein said second gauge is further configured to obtain the second thickness and the third thickness based on the first distance, the second distance, and the third distance.

9. The analyzing system as claimed in claim 1, wherein:

said housing surrounds and defines an inner space therein, the inner space has an entrance at a first side of the inner space, and an exit at a second side of the inner space opposite to the first side;

said carrying module includes a carrying base that is mounted on said weighing module, and a transport component that is mounted on said carrying base, that is configured to carry the solar panel module which is placed into the inner space through the entrance, and that is configured to transport the solar panel module toward the exit; and said carrying unit further includes a first alignment module that is mounted on one end of said carrying base adjacent to the exit, that is disposed inside the exit, and that is configured to switch between a blocking position and a release position, where said first alignment module in the blocking position blocks the solar panel module from moving through the exit so as to make the solar panel module abut against said first alignment module and thus align the solar panel module with the exit, and said first alignment module in the release position allows the solar panel module to move through the exit.

10. The analyzing system as claimed in claim 9, wherein the first side and the second side of the inner space are opposite to each other in a first direction, said carrying unit further includes a second alignment module that is mounted on said housing and that includes:

a guiding component that is mounted on said housing and that extends in a second direction perpendicular to the first direction;

two pushing components that are mounted on said guiding component and that are configured to move along said guiding component;

a connecting component that is disposed between and connected to said pushing components; and a driving component that is mounted on said housing, that is connected to said connecting component, and that is configured to drive said connecting component to simultaneously move said pushing components to move toward each other along said guiding component, so as to cooperatively push the solar panel module that is on said transport component to align with the first direction.

11. The analyzing system as claimed in claim 10, wherein said connecting component includes:

a rotating base that is mounted on said housing, that is connected to said driving component, and that is configured to rotate horizontally; and two connecting rods connected respectively to said pushing components, each of said connecting rods having one end eccentrically and pivotally connected to said rotating base in a radially symmetrical manner, and another end pivotally connected to one of said pushing components, wherein said rotating base is configured to be driven by said driving component to rotate horizontally, so as to drive said connecting rods to displace in opposite directions along the second direction, thus driving said pushing components to move in one of a first manner where said pushing components move toward each other, and a second manner where said pushing components recede away from each other.

12. The analyzing system as claimed in claim 9, wherein said housing includes:

a main body that surrounds and defines the inner space and that has a first side and a second side corresponding respectively to the first side and the second side of the inner space;

a first door module that is mounted on the first side of said main body and that is controllable to openably close the entrance; and a second door module that is mounted on the second side of said main body and that is controllable to openably close the exit.

13. The analyzing system as claimed in claim 1, the solar panel including a base layer and a cover layer that are on opposite sides and are apart from each other, said analyzing system further comprising:

a measuring unit that is mounted on said housing and that includes a measuring module, said measuring module including a first gauge that includes a first ultrasonic probe, and that is configured to place said first ultrasonic probe on a surface of the cover layer which is further away from the base layer, and to measure a first thickness of the cover layer using said first ultrasonic probe based on ultrasonic thickness measurement technology, and a second gauge that includes a second ultrasonic probe, and that is configured to place said second ultrasonic probe on a surface of the base layer which is further away from the cover layer, and to measure a second thickness of the base layer using said second ultrasonic probe based on the ultrasonic thickness measurement technology.

14. The analyzing system as claimed in claim 1, wherein said weighing module includes four load cells that are symmetrically mounted on said housing, and said carrying module is disposed on said load cells.

* * * * *